United States Patent [19]

Carlson, Jr. et al.

[11] Patent Number: 4,646,238

[45] Date of Patent: Feb. 24, 1987

[54] MATERIAL REQUIREMENTS PLANNING SYSTEM AND PROCEDURES FOR USE IN PROCESS INDUSTRIES

[75] Inventors: William H. Carlson, Jr., Milton, Mass.; Paul H. Shafer, San Jose, Calif.

[73] Assignee: Analog Devices, Inc., Norwood, Mass.

[21] Appl. No.: 665,036

[22] Filed: Oct. 26, 1984

[51] Int. Cl.[4] .............................................. G06F 15/00
[52] U.S. Cl. .................................... 364/403; 364/468
[58] Field of Search ............................... 364/403, 468

[56] References Cited

U.S. PATENT DOCUMENTS 4,459,663  7/1984  Dye ..................................... 364/200

Primary Examiner—Jerry Smith
Assistant Examiner—Allen MacDonald
Attorney, Agent, or Firm—Parmelee, Bollinger & Bramblett

[57] ABSTRACT

A system for controlling the flow of semiconductor products and their components through a production facility including assembly and final testing of a large number of different products with multiple product grades. The system stores information on the demand and inventory of all product grades together with grade distribution data giving the yield of all co-products of a product family from testing the common component of that family. The system includes means for calculating the number of common components to be tested to cover the requirements for all co-products of a family. The distribution data also gives the yield of all by-products of a test for particular products, and the system operates to adjust the inventory status for other products corresponding to such by-products, to avoid excess production of such other products in meeting projected demand. For cases where the data indicate for any product family a surplus of a higher grade and a shortage of a lower grade, the system includes means to decide whether to downgrade a portion of the higher grade to the lower grade; the projected inventory status of each grade is adjusted accordingly.

10 Claims, 7 Drawing Figures

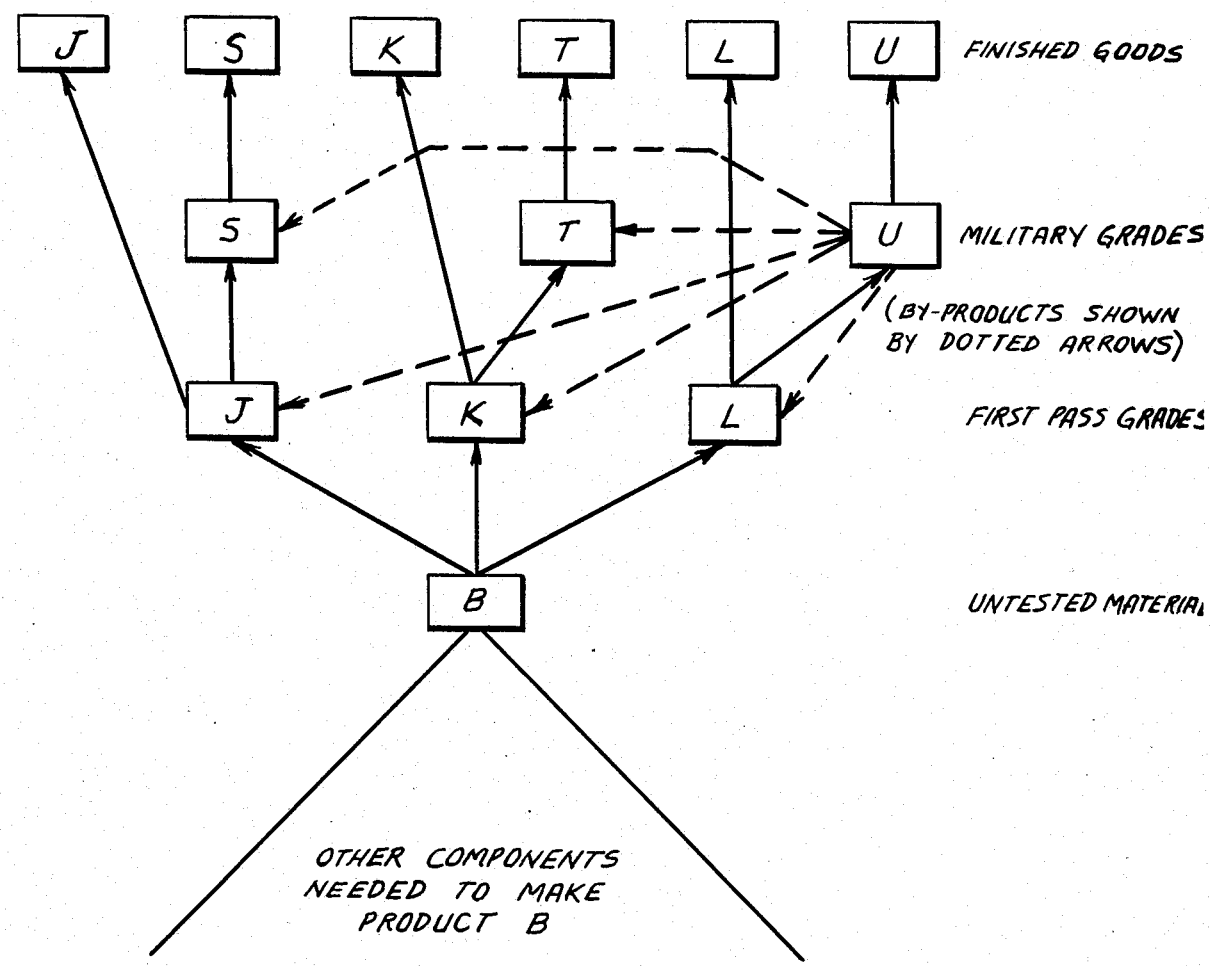

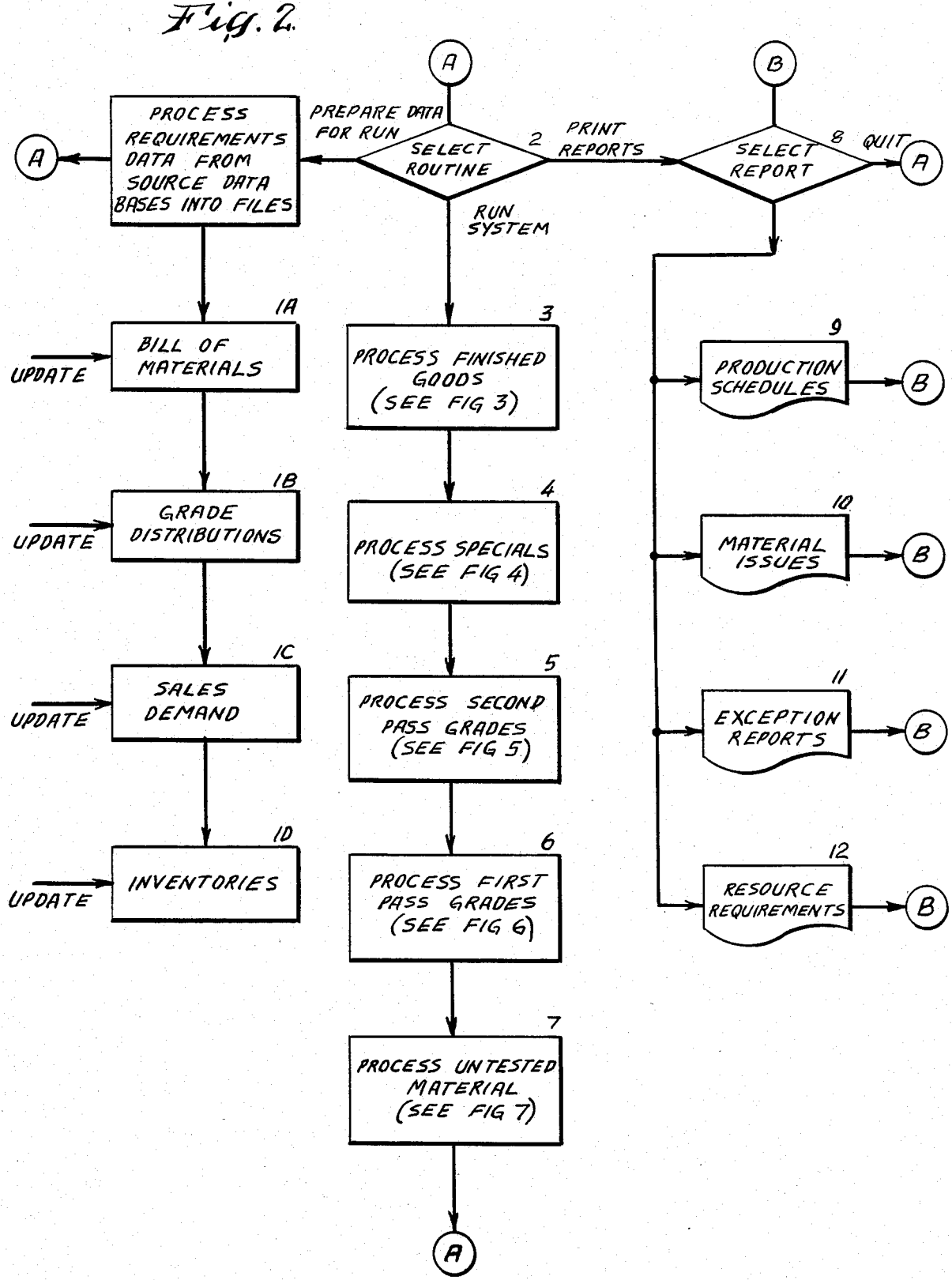

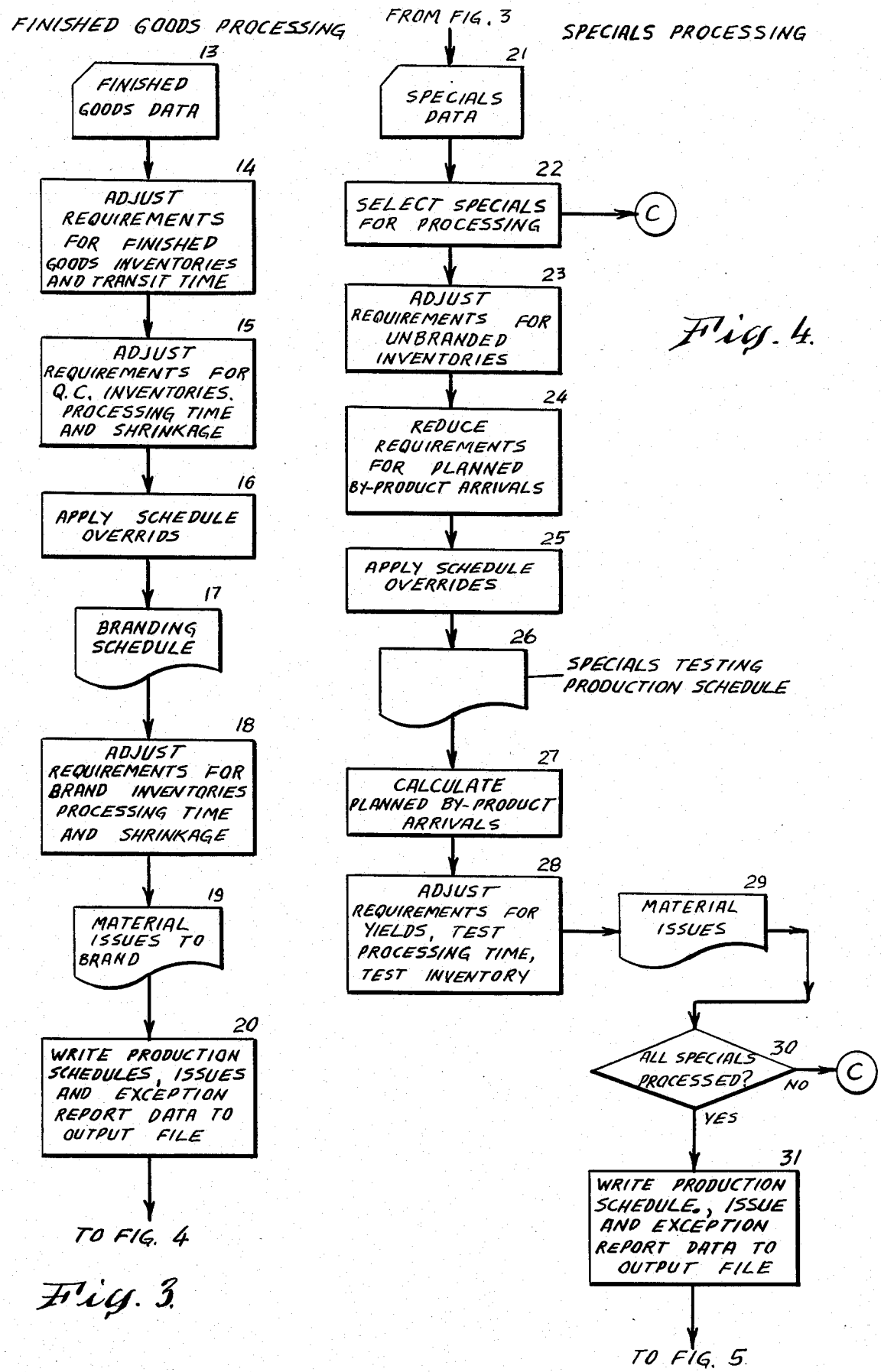

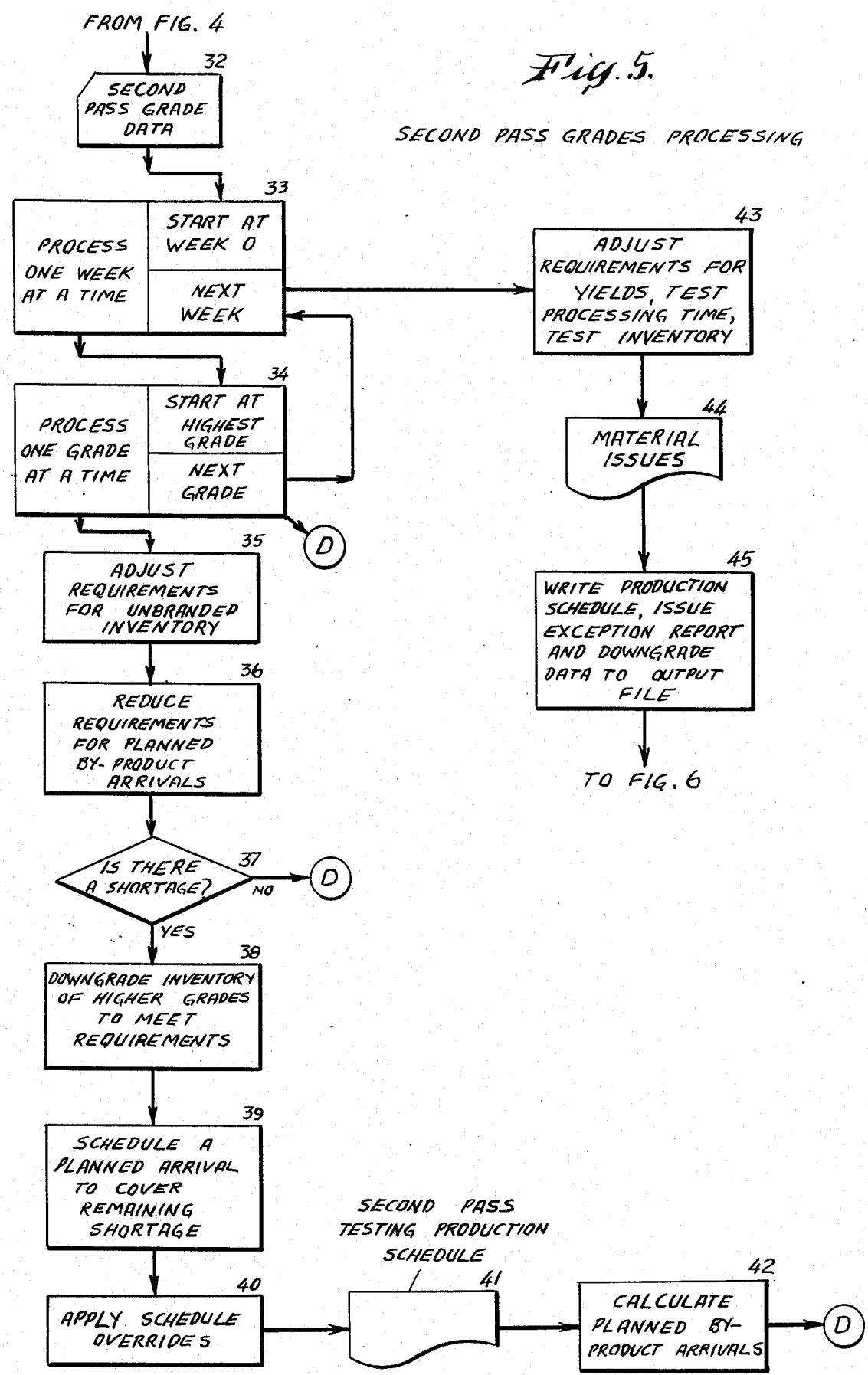

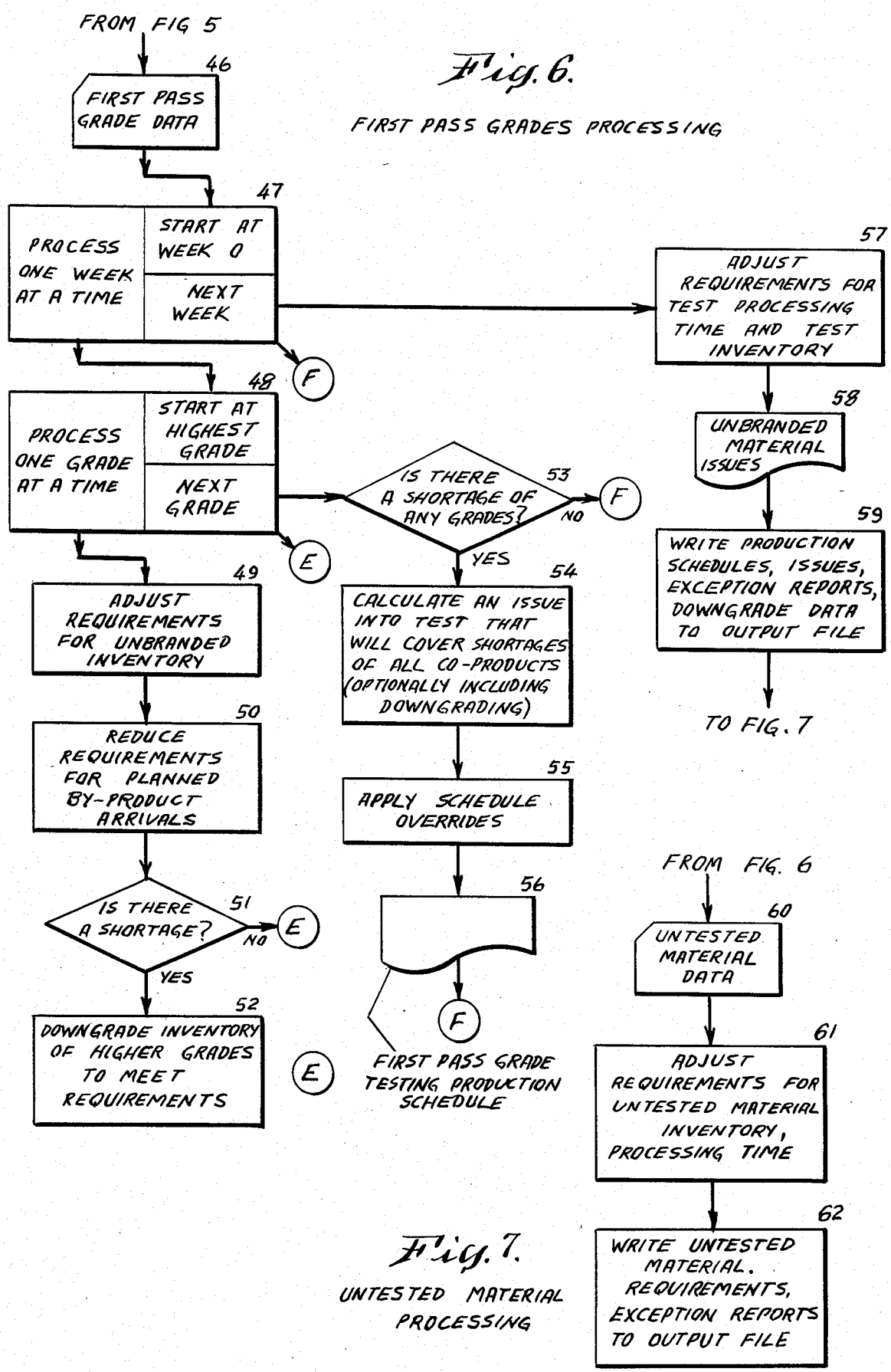

MATERIAL REQUIREMENTS PLANNING SYSTEM AND PROCEDURES FOR USE IN PROCESS INDUSTRIES

BACKGROUND OF THE INVENTION

1. Field of the Invention

This invention relates to a computerized system for planning the testing of products as part of a manufacturing process. The invention is illustrated for use in planning the testing of semiconductors in the form of integrated circuit (IC) chips.

Semiconductor chips require testing and grading against specifications before they can be sold. The testing of any lot of product will also sort the functional units into separate grades depending on their electrical characteristics. More rigorous or selective testing can then be performed on these grades to produce products which are guaranteed to perform in the more strenuous environment demanded by military or aerospace applications. In addition, certain customers may require special tests to be performed on the product for their specific use.

Production of semiconductors begins in wafer fabrication during which the electronic circuits are grown on thin wafers of silicon in a series of alternating photographic and deposition processes which create hundreds or thousands of identical circuits on each wafer. This process can take from two to upwards to ten weeks depending on the complexity of the process and the number of "layers" involved.

The effectiveness of the wafer fabrication process is dependent on many environmental factors over which the manufacturer has varying degrees of control but which have a definite effect on the functionality and electrical characteristics of the resulting product. In order to eliminate further expensive processing of non-functional circuits, the wafers are probed at this point—i.e. each circuit is powered up, tested and the failures are marked with ink to be later discarded.

After probing, the individual dice are separated, inspected for visual defects and mounted in the individual packages which allow them to communicate with the real world. These packages come in many shapes and sizes from two-lead metal cans to upwards of sixty-four lead dual in-line pin ceramic or plastic packages. Wires finer than a human hair connect the terminals on the dice to the leads on the packages which are then sealed to protect the chip from environmental and mechanical damage.

After this assembly process is complete, the units are tested and graded according to their electrical performance against the range of specifications. The simplest grades are measured at room temperature and are known as commercial. The more difficult grades are those for military and aerospace applications. These must pass strict government standards after being subjected to extreme environmental stress, including continual operation for a week under high temperatures. In addition, the critical characteristics of the higher grade products must not drift out of specification over the whole operating temperature range.

The testing process can be considered as a series of hurdles which the product must pass. Product which fails can be saved to retest against a different set of hurdles, sold as the highest grade for which it has qualified or conceivably sold as a lower grade if no other demand for the product exists.

The process is made especially complex by the large number of different types and grades of product. For example, in one commercial plant, 80 wafer types are assembled into 160 different package configurations which yield over 2500 different end products after testing. The simplest product has 2 grades while the most complex had 88 different grades of standard catalog items and customer specials.

The task for production control is to identify and schedule the correct sequence of tests and an adequate supply of untested material coming out of assembly to support the demand for all of the items. The goal is to accomplish this with minimum inventories and optimal utilization of scarce and expensive computerized test equipment whil maintaining timely and accurate deliveries.

2. Description of the Prior Art

The standard prior art technique for planning the type of production used for semiconductor chips—that is, the technique for specifically determining the requirements for production of the source materials needed in a higher level product—is called Material Requirements Planning (MRP). Such planning is carried out by a computer operating under software control. The computer computations typically are based on a Bill of Materials which defines the source components of any product, the sub-components of such components, and so forth down to the lowest level materials—usually raw materials.

Briefly, Material Requirements Planning performs its planning function by considering the demand for an item and subtracting out any inventories to determine additional production required. This net requirement is then "exploded", that is, multiplied by the appropriate quantities of each component and advanced by the time needed to produce the item. The result is the demand for each component. The process is repeated for each component in turn until the lowest level is reached.

SUMMARY OF THE INVENTION

In the testing process described herein, all untested products are given a first pass test to eliminate non-functional units and produce a preliminary grading. The output from the test becomes input to the military or second pass test. Optionally, the output from either the first pass or second pass test may become input to a test for so-called customer specials. Any product which passes any of the tests can be branded with its identifying grade and sold as a finished product.

The procedure is controlled by a software program operating with a data base defining the proper components for finished goods, customer specials (if used), second pass grades and first pass grades. The procedure resolves three issues in the testing environment which standard MRP does not address. These are: by-product planning, co-product planning, and downgrading, which may be described briefly as follows:

BY-PRODUCT PLANNING

When testing for military grades, some of the product will pass the test. The product which fails is still good product, however, and is called a by-product. Normally this by-product will be another item already in the Bill of Materials and most often the component item itself. Standard MRP does not account for the production of these by-products nor does it consider them as available inventory to be netted out of additional production requirements.

CO-PRODUCT PLANNTING

A special case occurs for first pass grades where two or more grades are simultaneously produced from the same test, and are referred to as co-products. In effect these grades are by-products of each other. Standard MRP which calculates items one at a time sequentially cannot simultaneously plan the component quantity which must be tested to meet the demand for all of these grades together.

DOWNGRADING

Because grading is a natural phenomenon independent of demand, its distribution does not necessarily match the distribution of demand. This may result in surplus inventories of higher grades and shortages of lower grades. There are circumstances where it makes economic sense to downgrade these higher grades to cover the shortages rather than to produce more of the lower grades. Standard MRP always covers shortages by additional production. In the system described herein, additional processing is employed to determine which products, when and in what quantities should be downgraded.

A general purpose computer system operating under software control as described herein resolves the above three issues through logic procedures inserted into standard MRP software.

BRIEF DESCRIPTION OF THE DRAWINGS

FIG. 1 is a simplified diagrammatic representation of hierarchical levels to which items can be assigned for testing;

FIG. 2 is a flow diagram giving an overview of the entire MRP system as modified to incorporate the present invention;

FIG. 3 is a flow diagram showing the logic of finished goods scheduling represented by functional block 3 of FIG. 2. (Note: the logic is standard prior art MRP and is shown herein only for completeness);

FIG. 4 is a flow diagram showing the logic of customer specials represented by the functional block 4 of FIG. 2;

FIG. 5 is a flow diagram showing the logic of second pass test planning represented by functional block 5 of FIG. 2;

FIG. 6 is a flow diagram showing the logic of first pass test planning represented by functional block 6 of FIG. 2; and FIG. 7 is a flow diagram showing the logic for planning untested material represented by the functional block 7 of FIG. 2.

DETAILED DESCRIPTION OF THE PREFERRED EMBODIMENT

The present invention is based on the concept that in some manufacturing industries there are relationships between the products being processed through testing which make it important and advantageous to plan the testing of certain product families together. To that end, the system to be described categorizes products into different levels so that each level can be processed using the distinctive procedures which apply to that level. A multi-level product structure used in the system to be described is as follows:

Level 0—Finished Goods
Level 1—Customer Specials
Level 2—Second Pass Tested Standard Items
Level 3—First Pass Tested Standard Items
Level 4—Untested Product Defining these in reverse order (i.e. in the direction in which product actually moves), Level 4 contains untested material as it comes from assembly, and Level 3 contains the grade distribution resulting from the first ambient test of newly assembled product. Typically in the semiconductor industry there are three grades—J, K and L, with J the lowest grade and L the highest. These grades may be branded and shipped as their level 0 branded standard commercial counterparts or issued for higher grade testing.

Level 2 contains the military versions of the commercial grades. The product is stressed, burned in and retested for its drift over a temperature range. An L so tested which retains its electrical characteristics might be called a U. A K might become T and a J and S. The L which fails as a U might still be an L or perhaps have degraded to a T or S, K or J. The exact distribution would be spelled out on a "lot traveller" accompanying the group of items to be tested and specifying characteristics derived from the Bill of Materials stored in the data base of the computer which controls the flow of product testing.

Level 1 contains customer specials which are produced by additional selective testing of Level 2 or 3 standard products for some customer specific parameters. This level may also contain specials which are made from other specials and thus can be divided into several sublevels. Level 1 can be considered optional, and the processing in Level 1 will not be discussed in detail herein.

Level 0 contains finished goods which are the final branded versions of the products manufactured at one of the lower levels. No additional testing is required to move a product to this level. Due to branding variations, however, several finished products can be made from the same unbranded component.

While this concept of levelling serves to group together products which interact in the planning process and which are planned using the same logic, it also retains the original concept of low level standard MRP code, namely that products are always at a higher level than their components. Level 0 items are always made from Level 1 2 or 3 items. Level 1 items are always made from other Level 1 items or from Level 2 or 3 items. Level 2 is always made from Level 3 which is always made from Level 4.

FIG. 1 presents a simplified exemplary illustration of the type of product-level hierarchy described above (omitting any showing of the "specials" level). It will be seen that the initial group of untested items referred to as B are assembled from other components (not identified in the diagram but listed in the Bill of Materials). A planned first pass test will be expected to produce products graded as J, K, L (identifying prescribed electrical characteristics), in pre-established ratios in accordance with experience data stored in the data base. Rejects will be discarded.

If it is desired to produce a number of items of military grade U, a group of grade L products will be tested. That is, military grade U requires the superior electrical characteristics of commercial grade L, but must be capable of such performance under military environmental conditions. Upon such testing, some of grade L will pass, to be designated grade U. Others will pass the military, requirements but with lower electrical characteristics, and be designated grades S or T (as indicated by the dotted lines). Still others will fail the military requirements, but still pass the electrical tests to be accepted back as grade L or as grades J or K. The final graded products can be branded and transferred to "finished goods".

In standardizing the product flow through test in such a level-oriented fashion, it is desirable to close out all test lots to a stock room after each level of testing is completed. This improves inventory control and lot traceability, and makes it possible to capture the actual grade distribution of all intermediate tests as inventory transactions which later become the basis for up-dating the grade distribution data base.

The grade distribution data base (which is not used in standard MRP planning) contains the planned yield distribution to all grades resulting from testing a component. If it is desired to plan a test for item SC from component JC, the yield must be known. For example, if 100 units of SC are needed and the yield is 50%, the demand for component JC will be 200. In addition, however, the present system takes into account the yield and identity of the by-products of this test. In this case there might be a 45% yield to JC (components which failed the SC test) while the other 5% are scrap, destroyed in the testing process.

A typical grade distribution data base entry might include the following:

|  | PRODUCT | COMPONENT | BY-PRODUCTS | | |
|---|---|---|---|---|---|
|  |  |  | SC | KC | JC |
| Item | TC | KC |  |  |  |
| Yield | .40 |  | .10 | .30 | .10 |

The grade distribution data base defines for all items in Levels 1, 2 and 3 the yield to that item from its component. Also defined is the identity of all by-products (which may be on the same or lower levels), and the yield to each. The system updates these grade distributions periodically through batch analysis of the historical stockroom grading inventory transactions.

The present system also incorporates a function referred to as downgrading, which will be described in detail hereinbelow. In order to plan downgrading, it is necessary to know the hierarchy of grades, that is, which standard grades within Levels 2 and 3 can be substituted for lower grades with no additional testing. This information also is stored in the grade distribution data base.

Referring now to FIG. 2, it will be seen that the overall system flow diagram breaks into three main routines. The diamond 2 represents the select routine decision, to prepare the data for run, to run the system, or to select a report. The letters in circles represent return points for the system loops.

Block 1 indicates the portion of the system which prepares the raw data for processing including the Bill of Materials (Block 1A), grade distribution data (Block 1B), sales demand (Block 1C) and inventories (Block 1D). This information is stored in data base files and used by the operating part of the system when it is being run to prepare the plan for assembly and testing.

In a standard Bill of Materials used in prior art MRP systems, products are assigned to levels based on their relationship to other products. Finished goods are assigned to the first level (usually called Level 0); their components are assigned to Level 1 etc., down to the lowest level. The general rule is that an item's level number is equal to the highest level number of any item it is used in plus one. Standard MRP processes items by level starting at 0 thus assuring that for any item all demand for it as a component of other items will be present at the time that item is processed.

In the Bill of Materials used in the present system, items are not assigned to relative levels but rather to absolute levels based on their testing classification, namely: Finished Goods, Customer Specials, Second Pass, First Pass and Untested Product. This classification does not violate the standard rule that an item comes after any item of which it is a component, but it does assign to the same level items which are to be planned together because of by-product or co-product relationships. This assignment is also advantageous because it defines exactly the proper sequence for planning the products and makes it possible to match each level or set of products to the appropriate modified logic. Block 1A represents this Bill of Material data base information. A simplified example of the basic type of information contained in the Bill of Materials is represented by the diagram of FIG. 1.

Block 1B represents a series of tables stored in the data base giving the percentage yield to by-product or co-product items which result from testing a component. (A by-product is defined as: a usable unbranded grade that has failed the test for a desired item. A co-product is defined as: one of several related usable unbranded grades classified by the same test.)

Block 1C represents projected sales demand such as that based on marketing sales estimates. Block 1D represents the inventory data. The information of Blocks 1C and 1D would be found in one form or other in any MRP system.

Blocks 9 through 12 represent output reports generated by the system. Such reports would be generated in any standard MRP system.

Blocks 3 through 7 represent the logical processing procedures which are at the heart of the present system. The processing steps for each of these blocks is described in expanded detail in FIGS. 3-7, and will be explained in more detail hereinafter. It may be noted, however, that each block 3-7 represents a single level as defined above. The processing at each of these blocks applies the appropriate logic to the items at its level and all items in a level are finished before the next level is begun. The end result is a projected assembly and test plan for a relatively long time frame typically subdivided into weeks, and providing projections for all products indicating the number of each to be assembled and to be input into the various test levels.

FIG. 3 shows the data processing logic for the finished goods level (Level 0) represented by Block 3 of FIG. 2. This logic is standard MRP logic and is included only for completeness. NO testing, yielding or grading is involved in the brand/final-QC process. Independent demand is introduced at Block 13 as a combination of backlog, forecast and safety stock for all standard and special finished goods. This demand, net of finished goods inventories, becomes dependent demand for those items' unbranded components and all items are processed before proceeding to Level 1.

The resulting requirements are not part of the production schedule for test, but rather a transfer plan which drives the test schedule, serving as the master schedule. This transfer plan is exploded through the test planning logic sequences to produce a testing schedule for Levels 1, 2 and 3 and a Level 4 requirement for assembly. Test capacity constraints for the test schedule levels and material constraints in assembly can then be identified if necessary.

Blocks 14, 15 and 18 execute normal inventory netting, lead time adjustments and shrinkage calculations. Block 16 allows the schedules to modify the system generated schedules using a standard industry technique known as a firm planned order. Blocks 17 and 19 create reports which can be printed as normal MRP outputs and Block 20 saves the exploded demand for components which will be part of the input at the lower levels.

FIG. 4 shows the data processing logic for the customer specials level. Block 21 assembles the demand, yield, inventory, and Bill of Materials data for all of the items which have been assigned to this level. Although the processing for this level is optional, depending upon the nature of the industry, it does include process steps which are used at lower levels, and therefore certain parts of the customer specials procedure will be described herein.

Block 22 selects the special products to be processed first. This is necessary because some specials may have other specials as their component or as their by-product. In such a case it is necessary to process the higher level item first and then the component or by-product item. Block 22 first selects all of the specials which are neither components nor by-products of other items for processing at this time. After these items have been completed and eliminated from the list, the next execution of Block 22 will select the next level of components for processing. This process is repeated until all of the specials have been processed.

For those items selected in Block 22 the processing continues in Block 23. Here the inventory is subtracted from the demand as in normal MRP.

Block 24 introduces part of the new logical processing which deals with by-product planning, specifically that of netting out by-products as an inventory supply. This is necessary at the specials level because the by-products of some specials are other specials. Block 23 subtracted inventory on hand from the first time period's demand. Block 24 subtracts out by-product supplies from the demand in the period when they will be available. (Note: The by-product supply data comes from other portions of the system, as will be described later.) For example, if there is demand of 500 units each for two periods and an on-hand inventory of 50 units and by-product supplies of 100 units each period, the net demand for each period would be calculated as follows:

|  | Period 1 | Period 2 |
| --- | --- | --- |
| Demand | 500 | 500 |
| Inventory | 50 |  |
| By-product | 100 | 100 |
| Net demand | 350 | 400 |

This computation has the effect of covering demand with an alternate supply of material (i.e. the by-product from prior planning calculations) before calling for more production. Standard MRP does not do this.

Blocks 25 and 26 concern firm planned orders and standard MRP reports, which are conventional, and therefore will not be described.

Block 27 introduces the remaining part of the new by-product planning logic—the calculation of the supply of by-products resulting from the tests which are being planned. (This result may be used in Block 24 in a later processing sequence for another item at this level.)

This by-product computation requires two steps. Step one computes the quantity of the component which must be tested to cover the demand. This is done by dividing the net demand by the yield. For example, 100 units of product A with a 50% yield requires the testing of 200 units of component B.

Step two computes the by-products. For example, if the grade distribution data base for product A above shows two by-products B (yield 20%) and C (yield 25%), then block 27 generates a supply of 40 units of B and 50 units of C for the same period as the projected demand of 100 units of A. Note that B can be both a component and a by-product of the same test, but because the component demand is advanced to an earlier period by the length of the testing process the demand for 200 units of B as a component will precede the supply of B as a by-product.

Blocks 28 and 29 continue the normal MRP logic. Block 30 checks to see whether or not there are additional levels of specials to be processed. If so, the program branches back to Block 22 as indicated by the letter C in a circle. If not, it proceeds to Block 31 which saves the exploded demand and any by-product supplies for the second or first pass grades, then passes control to the second level on FIG. 4. If no specials processing is included in the system, the finished goods processing of FIG. 2 will be followed immediately by that of FIG. 4.

FIG. 4 specifies the processing of second pass grades. Here, unlike the specials level, all of the second pass grades of the same product family are processed together, one week at a time. This is necessary in order to correctly account for by-product supplies to a lower grade from a higher grade and to allow for downgrading. This simultaneous processing of multiple products is a significant departure from standard MRP and highly important in the functioning of the new system.

Block 32 functions in the usual way to assemble the data for the products at this level. This data comes from the data files of Block 1 (FIG. 2) and comprises inventories, projected demand, grade distribution and the Bill of Materials. Blocks 33 and 34 control the sequence of processing one week at a time and, within each week, one grade at a time, proceeding from the highest to the lowest. Block 35 nets out the inventory using standard MRP logic. Block 36 represents the new logical processing used to net out by-product arrivals which may either come from the specials level or from higher second-pass grades. The calculations are exactly the same as described above with respect to Block 24 and therefore will not be repeated here. Block 37 branches to the next lower grade if there is no requirement for the current one.

Block 38 introduces the logical processing for the downgrading procedure discussed previously. Because grading is a natural phenomenon independent of demand its distribution does not necesarily match the distribution of demand. This may result in surplus inventories of higher grades and shortages of lower grades. There are circumstances where it makes economic sense to downgrade these higher grades to cover the shortages rather than produce more of the lower grades. The processing procedures in Block 38 decide whether or not to downgrade any surplus inventory of higher grades in the same family to cover the requirement of the current grade. This downgrading is a very significant departure from standard MRP.

Any downgrading decision involves three questions, asked from the point of view of the receiving item, i.e. the lower grade:

1. Is there a shortage—if not, no downgrading is necessary.
2. Is there a higher grade with a surplus—if not, no downgrading is possible.
3. Should the higher grade be downgraded—this decision involves a comparison of the relative demands and yields of the two grades.

For example, in the case of three grades L, K and J where L is the highest grade and J the lowest, the procedure first determines whether there is a shortage of K and if so, whether or not to downgrade L. Then a shortage of J is determined and, if so, a decision is made whether or not to downgrade first K and then L.

1. A shortage exists if the demand for a grade in the current period is larger than the total of the beginning inventory and the by-product supply.
2. A surplus exists if the demand for the grade in the current period is smaller than the total of the beginning inventory and the by-product supply.
3. The formula for determining whether to downgrade has three parts:
(a) For the higher (donor) grade compute:

$$\sum_{I=W}^{N} (D_I - B_I) \times (N - I + 1)/Y$$

where
I is a counter beginning with the current week W
N is the total number of periods (weeks) in the plan
$D_I$ is the demand for the grade in the period
$B_I$ is the by-product supply in the period
Y is the yield to the grade (N−I+1) is a factor which gives greater weight to near term demand than future demand.

It can be seen that the outcome from this formula will be increased by large demand, near term demand, small by-product supply, and low yield. The outcome will be decreased by small demand, far future demand, large by-product supply and high yield.
(b) Compute the same formula for the lower (receiver) grade.
(c) Compare the results. If the result for the donor is lower than for the receiver, the higher grade should be downgraded.

| For example: Period (I) | 3 | 4 | 5 | 6 | 7 | 8 (N) |
|---|---|---|---|---|---|---|
| L Beginning Inventory | 200 | | | | | |
| Y = .3 Demand | 50 | 150 | 100 | 300 | 500 | 100 |
| By-Product Supply | 100 | 100 | 100 | 100 | 100 | 100 |
| K Beginning Inventory | 0 | | | | | |
| Y = .4 Demand | 600 | 500 | 800 | 300 | 900 | 700 |
| By-Product Supply | 50 | 100 | 50 | 40 | 200 | 300 |

-continued

| For example: Period (I) | 3 | 4 | 5 | 6 | 7 | 8 (N) |
|---|---|---|---|---|---|---|
| (N − I + 1) | 6 | 5 | 4 | 3 | 2 | 1 |

1. K has a shortage of 550 in week 3 (600 − 50)
2. L has a surplus of 250 in week 3 (200 + 100 − 50)
3. (a) Donor formula = (6 × −50) + (5 × 50) + (4 × 0) + (3 × 200) + (2 × 400) + (1 × 0)/.3 4500
(b) Receiver formula = (6 × −550) + (5 × 400) + (4 × 750) + (3 × 260) + (2 × 700) + (1 × 300)/.4 27200
(c) Since (b) is larger than (a) the surplus of 250 L should be downgraded to K leaving 300 more K to make from new testing.

Once the decision to downgrade has been made, then the quantity to downgrade is the surplus of the higher grade or the net requirement of the lower grade, whichever is less. Downgrading should only take place when the demand for the higher grade is low or far enough in the future (relative to the demand for the lower grade), and the yield (the ability to produce more of the higher grade later) is reasonably high.

The net effect of downgrading is to minimize the cost of carrying the excess inventory and the cost of current testing.

Block 39 calculates the planned production to cover the balance of the current grade (i.e. after the downgrading transfer) using normal MRP logic. Block 40 applies firm planned orders and Block 41 prepares the schedule report, as discussed previously.

Block 42 calculates by-product supplies to lower second-pass grades or to first-pass grades, using the same calculations as described above with respect to Block 27. Blocks 43, 44 and 45 perform the same standard MRP functions as Blocks 28, 29 and 31, referred to above. All of the components are on the first-pass level.

After all grades have been completed for one week, the processing proceeds to the next week. After all families on the second-pass level have been completed, the processing proceeds to the first pass level of FIG. 6.

The first-pass processing is very similar to the second-pass processing. The sequence proceeds from week to week, and from high grade to low grade, governed by Blocks 47 and 48. This sequence provides the basis for the co-product planning at the first-pass level. Blocks 49–52 represent logical processing steps identical to those of Blocks 35–39 at the second-pass level.

Once the net requirements for all grades in the family have been calculated, including the projection of inventory downgrades as described above, co-product processing is carried out to determine the proper quantity of the component common to all grades which will yield enough of each grade to cover all of their requirements. That is, it is necessary to compute the issue quantity of the common component which will cover the yield to the most limiting of the grades in the set. Most simply this means dividing the net demand for each grade by its yield and issuing the largest of the three resulting quantities.

Set forth below is an example of such co-product planning using three grades (L, K and J) where L is the highest grade.

| Item | Demand | Yield | Test Qty. | Output |
|---|---|---|---|---|
| L | 100 | .20 | 500 | 200 L |
| K | 300 | .30 | 1000* | 300 K |
| J | 450 | .50 | 900 | 500 J |

The demand for the three grades are 100, 300 and 450 respectively, and their yields are 20, 30 and 50%. The processing divides the net demand for each grade by its yield and issues an order for the largest of the three resulting quantities. In this case, it would calculate an issue of 1000 which will just cover the requirement for K, and result in an extra 100 L's and an extra 50 J's.

It may be advantageous also to employ downgrading in co-product planning. By using surplus yield of higher grades to cover lower grades, all the demand can be satisfiled while testing fewer parts, using less capacity and generating less inventory.

Set forth below is a table giving an example where downgrading is applied fully to the same three products with the same initial demand and yield as listed above.

| Item | Demand | Yield | Test Qty. | Output | Downgrading |
|------|--------|-------|-----------|--------|-------------|
| L    | 100    | .20   | 500       | 170 L  | −70         |
| K    | 400    | .50   | 800       | 255 K  | +45         |
| J    | 850    | 1.00  | 850*      | 425 J  | +25         |

In this case, however, the computation takes into account cumulative demand and cumulative yield for each successive grade. For example, the demand for K is cumulative of L and K (100+300=400) with yield of L and K combined (0.20+0.30=0.50) before dividing to determine the limiting test quantity. While 500 will cover the L alone and 800 will cover L and K combined, 850 are needed to cover all three grades. This is the amount to be tested—less than the 1000 needed in the no-downgrade option. This yields an extra 70 L's, and 45 of them will be used to cover the K deficit (300 were needed) and 25 to cover the J deficit (450 were needed).

Alternatively, the downgrading algorithm (see above) can be used to decide which grades should be downgraded to which. These downgrade combinations can then be planned together by adding their demands and yields and computing the issue quantity which covers the combination. After this downgrading adjustment has been made, the planned issue quantity is the largest needed to support any of the combinations or uncombined grades in the set. It will be found that use of the downgrading algorithm for co-product planning will produce a result intermediate the no-downgrading case (1000 units) and the full-downgrading case (850) units, which may be a more satisfactory decision from a practical point of view.

The resulting yield to each grade and the appropriate downgrade transactions then are computed, followed by the ending balances which will roll into the following period.

Block 55 applies firm planned orders as described above. Blocks 56–59 are the same as Blocks 41, 43 44 and 45 at the second-pass level.

After all first-pass families have been processed for all weeks, there results a test schedule for Level 3 items and dependent demand for Level 4, i.e. the components of untested material. This net requirement is passed on to the standard MRP logic at the lower levels of the product structure, as indicated in FIG. 7.

To summarize, processing procedures of the disclosed system are carried out at five levels of the product structure as set forth below:

0. FINISHED BRANDED DEVICES

This module first calculates a schedule for receipts into finished goods by netting out existing on-hand inventories against demand (backlog and forecast) and inventory targets. Against this requirement it applies inventories in factory bonded stock and final QC and offsets by lead time to compute the schedule for branding and transfer to final QC. This schedule is saved and printed and can be modified with "firm planned orders" which affect the schedule at lower levels and can be saved to apply to subsequent runs of the system.

These requirements net of in process inventories at brand are captured as issues from unbranded stock of the item's component and will be used as demand for that component at the appropriate level (1, 2 or 3).

Exception reports highlighting current and projected inventory imbalances are generated at this and all subsequent levels.

1. PRODUCTS SPECIALLY SELECTED FROM OTHER PRODUCTS

In this level, items and their components can both exist on the same level of the product structure. Items are processed in successive batches so that the requirements for an item's component are generated before that component is processed.

The processing consists of the normal calculations, i.e. demand (for the Level 0 or other Level 1 item) net of existing unbranded inventory becomes the scheduled test completion for the item. That requirement, divided by the yield, offset by a lead time, and net of existing work in process inventory is the demand for the item's component which is another Level 1 or a Level 2 or 3 item.

This level (a) considers by-product arrivals of the item from other Levell tests before computing additional tests for the item and, (b) calculates by-products to other products (on level 1, 2 or 3) which will result from the test for this item.

2. SECOND PASS TESTED STANDARD GRADES

This level employs the by-product computations to consider arrivals from Level 1 and generates by-product calculations for other Level 2 and 3 items.

This level also employs downgrading to apply excess inventories of higher grades to demand for lower grades of the same product family before scheduling new testing of the lower grade. This level therefore is processed one week at a time and within each week from the highest to the lowest grades.

3. FIRST PASS STANDARD GRADES

This level includes consideration of by-product arrivals from Levels 1 and 2 tests and inventory downgrading logic introduced in Level 2.

In addition, it calculates the correct quantity of the untested component which will yield the proper quantities of each of the several first pass grades to meet their demands. In so doing it may determine when and in what amounts higher grades yielded from the tests should be downgraded to meet the demand for lower grades thus reducing the total requirement for testing.

4. UNTESTED MATERIAL

This level uses standard MRP logic to determine the required receipts of untested material to meet the Level 3 requirements.

Although a preferred embodiment of the invention has been disclosed herein in detail, it is to be understood that this is for the purpose of illustrating the invention, and should not be construed as necessarily limiting the invention since those of skill in this art can readily make various changes and modifications thereto without departing from the scope of the invention as reflected in the claims hereof.

What is claimed is:

1. In combination in a system for controlling the flow of a plurality of products and components thereof through the assembly and testing procedures of a manufacturing operation comprising plural sequential process steps, including the development of an assembly and test schedule for the successive periods of a forward planning time frame, and wherein the products are arranged in families comprising different grades meeting respective performance specifications corresponding to different quality ratings, said system including data file means for storing information representing the inventory status of each product grade and the expected demand for each product grade during each of said periods, said system being of the type which is arranged to make calculations with respect to such stored information so as to determine the net requirements for each product grade during each of said successive time periods;

that improvement to such system wherein said data file means stores grade distribution information giving the co-product yield for each grade of each product family from testing the common component of the product family; and said system further comprising means to calculate, based on said grade distribution information, the number of such common components to be tested for each of said periods in order to meet the net requirements projected for the co-product grades for those periods.

2. A system as in claim 1, wherein said data file means further includes stored by-product information giving for at least certain of the products the identities and percentages of items which will be produced as by-products when testing for any particular one of said certain products selected;

said system further including means to calculate and to store for a projected test of such particular product the number of each such by-products to be produced; and means responsive to such stored by-product number data for updating the effective inventory of a corresponding item when the net requirements for that item are being developed subsequently.

3. A system as in claim 1, including means operable in making said calculations with respect to said stored information, for determining the net requirements for at least two grades of the same product family, to downgrade a surplus portion of the higher of said grades to the lower grade so as to minimize the need for additional assembly or testing to produce the lower grade.

4. A system as in claim 3, wherein said downgrading decision is made by taking into account the relative demands and yields of the two grades.

5. A system as in claim 1, including means operable, in calculating said number of common components, to decide whether to downgrade a portion of a higher grade to cover the requirements for a lower grade of the product family.

6. A system as in claim 5, wherein the downgrading desicion is based on the relative demands and yields of the two grades.

7. In combination in a system for controlling the flow of a plurality of products and components thereof through testing procedures of a manufacturing operation comprising plural sequential process steps, said system including means for developing an assembly and test schedule setting forth the planning goals for each of the products for the successive periods of a forward planning time frame, each of the products being required to meet respective performance specifications to be designated as such product, said system including data file means for storing information representing the inventory status of each product and the expected demand for each product during each of said periods, said system being of the type which is arranged to make calculations with respect to such stored information so as to determine the net requirements for each product;

that improvement to such system wherein said data file means stores information giving for at least certain of the products the identities and yields of items which are expected to be produced as by-products when testing for any particular one of said certain products, said items corresponding to other products being manufactured in said manufacturing operation;

means to calculate, based on said by-product information, the number of such by-product items which will result from testing for such particular product; and means for adjusting the effective inventory data for said other products in accordance with said by-product number data.

8. In combination in a system for controlling the flow of a plurality of products and components thereof through the assembly and testing procedures of a manufacturing operation comprising plural sequential process steps, including the development of an assembly and test schedule for the successive periods of a forward planning time frame, and wherein the products are organized in families comprising different grades meeting respective performance specifications corresponding to different quality ratings, said system including data file means for storing information representing the inventory status of each product grade and the expected demand for each product grade during each of said periods, said system being of the type which is arranged to make calculations with respect to such stored information so as to determine the net requirements for each product grade during each of said successive time periods;

that improvement to such system comprising means operable in making said calculations with respect to said stored information, for determining the net future requirements for at least two grades of the same product family, to downgrade a surplus portion of the higher grade to the lower grade and to adjust the effective inventory of both grades.

9. A system as in claim 8, including means responsive to the relative demands and yields of the two grades for making the decision as to whether to downgrade.

10. A system as in claim 9, wherein said responsive means comprising means to calculate, for the two products, the following:

$$\sum_{I=W}^{N} (D_I - B_I) \times (N - I + 1)/Y$$

where
- I is a counter beginning with a current week W
- N is a total number of periods (weeks) in a plan
- $D_I$ is a demand for the grade in the period
- $B_I$ is a by-product supply in the period
- Y is a yield to the grade
- (N−I+1) is a factor which gives greater weight to near term demand than future demand.

* * * * *